United States Patent
Caine et al.

(10) Patent No.: US 10,290,381 B2
(45) Date of Patent: May 14, 2019

(54) METHOD AND APPARATUS FOR A HIGH-TEMPERATURE DEPOSITION SOLUTION INJECTOR

(75) Inventors: Thomas Caine, Sunol, CA (US); Adrian Mistreanu, Wilmington, NC (US); Russell Alexander Seeman, Sunol, CA (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 915 days.

(21) Appl. No.: 13/340,918

(22) Filed: Dec. 30, 2011

(65) Prior Publication Data
US 2013/0170602 A1 Jul. 4, 2013

(51) Int. Cl.
*G21C 17/022* (2006.01)
*G21C 19/28* (2006.01)

(52) U.S. Cl.
CPC ......... *G21C 17/0225* (2013.01); *G21C 19/28* (2013.01); *Y10T 137/0318* (2015.04); *Y10T 137/87571* (2015.04)

(58) Field of Classification Search
None
See application file for complete search history.

(56) References Cited

U.S. PATENT DOCUMENTS

| | | | |
|---|---|---|---|
| 950,295 A | 2/1910 | Marsedn | |
| 1,243,892 A * | 10/1917 | Strong | B65G 53/00 138/37 |
| 1,496,345 A * | 6/1924 | Lichtenthaeler | B01F 5/0451 366/147 |
| 2,816,518 A | 12/1957 | Daggett | |
| 3,198,436 A | 8/1965 | Kurzinski et al. | |
| 3,307,567 A | 3/1967 | Gogarty et al. | |
| 3,606,166 A * | 9/1971 | Whear | A62C 35/605 169/16 |

(Continued)

FOREIGN PATENT DOCUMENTS

CA 2438988 A1 * 9/2002 ............ B01F 5/0473
DE 202007015225 U1 1/2008

(Continued)

OTHER PUBLICATIONS

Handbook of Hydraulic Resistance, AEC-tr-6630. Accession bumber: ML12209A041. Dec. 31, 1960. p. 27. publicly available: <http://pbadupws.nrc.gov/docs/ML1220/ML12209A041.pdf>.*

(Continued)

*Primary Examiner* — Lily C Garner
(74) *Attorney, Agent, or Firm* — Harness, Dickey & Pierce, PLC

(57) ABSTRACT

A method and apparatus for a deposition solution injector for a nuclear reactor that may inject an ambient temperature deposition solution into a high temperature, high pressure feed-water flow line. The method and the apparatus ensures that the deposition solution is delivered in a location within the feed-water that is beyond a boundary layer of flowing water, to prevent smearing of the solution and prevent clogging of the deposition solution within the injector. The axial cross-sectional profile of the injector, and the location of an injection slot on the injector, may reduce vortex eddy flow of the feed-water into the injector to further reduce injector blockage.

9 Claims, 4 Drawing Sheets

(56) References Cited

U.S. PATENT DOCUMENTS

| | | | |
|---|---|---|---|
| 3,638,932 | A | 2/1972 | Masella et al. |
| 3,794,299 | A * | 2/1974 | Wagner .................. B01F 5/0057 |
| | | | 210/198.1 |
| 4,198,815 | A | 4/1980 | Bobo et al. |
| 4,442,047 | A | 4/1984 | Johnson |
| 4,564,298 | A * | 1/1986 | Gritters et al. ............ 366/173.2 |
| 4,696,324 | A | 9/1987 | Petronko |
| 4,735,044 | A | 4/1988 | Richey et al. |
| 4,834,343 | A * | 5/1989 | Boyes ................... B01F 3/0876 |
| | | | 239/405 |
| 4,861,165 | A * | 8/1989 | Fredriksson .......... B01F 5/0057 |
| | | | 138/44 |
| 5,105,843 | A | 4/1992 | Condron et al. |
| 5,173,542 | A | 12/1992 | Lau et al. |
| 5,239,773 | A | 8/1993 | Doolittle, Jr. |
| 5,356,213 | A * | 10/1994 | Arpentinier ............. B01F 5/045 |
| | | | 366/165.1 |
| 5,444,747 | A * | 8/1995 | Terhune ........................ 376/372 |
| 5,511,725 | A | 4/1996 | Barker et al. |
| 5,607,626 | A | 3/1997 | Kunkle et al. |
| 5,625,656 | A | 4/1997 | Hettiarachchi et al. |
| 5,692,684 | A | 12/1997 | Zurmuhlen |
| 5,818,893 | A | 10/1998 | Hettiarachchi |
| 6,035,886 | A | 3/2000 | Kerr |
| 6,056,057 | A | 5/2000 | Vinegar et al. |
| 6,085,796 | A | 7/2000 | Riga |
| 6,165,372 | A * | 12/2000 | Ziemer ................. B01F 3/0865 |
| | | | 210/198.1 |
| 6,659,636 | B1 * | 12/2003 | Matula .................. B01F 3/0865 |
| | | | 366/165.1 |
| 6,726,994 | B1 | 4/2004 | Araki et al. |
| 6,869,213 | B2 * | 3/2005 | Cappellino ........... B01F 5/0451 |
| | | | 366/171.1 |
| 6,915,851 | B2 | 7/2005 | Vloedman et al. |
| 7,024,861 | B2 | 4/2006 | Martling |
| 7,118,801 | B2 | 10/2006 | Ristic-Lehmann et al. |
| 7,137,569 | B1 * | 11/2006 | Miller ...................... B01F 5/045 |
| | | | 239/426 |
| 7,258,831 | B2 | 8/2007 | Vecchiet et al. |
| 7,592,406 | B2 | 9/2009 | Kenny et al. |
| 7,943,099 | B2 * | 5/2011 | Strebelle ............... B01F 5/0453 |
| | | | 422/140 |
| 8,129,462 | B2 | 3/2012 | Hsu et al. |
| 8,753,044 | B2 | 6/2014 | Greenwood et al. |
| 9,028,767 | B2 * | 5/2015 | Rasanen .............. D21H 17/675 |
| | | | 162/100 |
| 2002/0101953 | A1 * | 8/2002 | Hettiarachchi et al. ...... 376/306 |
| 2002/0179739 | A1 | 12/2002 | Kunkle et al. |
| 2006/0272332 | A1 * | 12/2006 | Moraes ........................... 60/776 |
| 2007/0251888 | A1 | 11/2007 | Matula |
| 2009/0086878 | A1 | 4/2009 | Stellwag et al. |
| 2009/0154636 | A1 * | 6/2009 | Tran et al. .................... 376/361 |
| 2010/0055308 | A1 | 3/2010 | Dulka et al. |
| 2010/0116512 | A1 * | 5/2010 | Henry .................... A62C 5/022 |
| | | | 169/14 |
| 2012/0049509 | A1 | 3/2012 | Lininger et al. |
| 2012/0298216 | A1 | 11/2012 | Geertsen |
| 2014/0140465 | A1 | 5/2014 | Ishida et al. |
| 2014/0175186 | A1 | 6/2014 | Caine et al. |
| 2015/0292661 | A1 | 10/2015 | Gilbreath et al. |

FOREIGN PATENT DOCUMENTS

| | | | | |
|---|---|---|---|---|
| EP | 2395130 | A1 | 12/2011 | |
| ES | 2132074 | T3 | 8/1999 | |
| ES | 2162895 | T3 | 1/2002 | |
| GB | 718760 | A | 11/1954 | |
| JP | 53007403 | U | 1/1978 | |
| JP | 2000509149 | A | 7/2000 | |
| JP | 2007120755 | A | 5/2007 | |
| JP | 2009145348 | A | 7/2009 | |
| TW | 200926204 | A | 6/2009 | |
| TW | 201015585 | A | 4/2010 | |
| WO | WO-8200706 | A1 | 3/1982 | |
| WO | 9917302 | A1 | 4/1999 | |
| WO | WO-2004056487 | A1 | 7/2004 | |
| WO | WO 2009065220 | A1 * | 5/2009 | ............ B01F 3/0865 |
| WO | WO-2014133618 | A2 | 9/2014 | |

OTHER PUBLICATIONS

MX Office Action issued in connection with corresponding MX Patent Application No. MX/a/2012/014745 dated Aug. 19, 2013.

Unofficial English translation of an ES Search Report and Written Opinion dated Feb. 21, 2014 issued in connection with corresponding ES Patent Application No. 201231964.

International Search Report and Written Opinion dated Nov. 28, 2014, issued in corresponding International Application No. PCT/US2013/073800.

Invitation to Pay Additional Fees issued by the International Searching Authority, dated Sep. 11, 2014 and issued in International Application No. PCT/US2013/073800.

Mar. 6, 2015 Office Action in co-pending U.S. Appl. No. 13/722,182.

Office Action in co-pending U.S. Appl. No. 13/722,182, dated Nov. 18, 2015.

Taiwan Notice of Allowance issued in connection with corresponding TW Application No. 101148521 dated Jul. 29, 2016.

International Search Report and Written Opinion issued in corresponding PCT Application No. PCT/US2016/58556 dated Jan. 19, 2017.

Unofficial English Translation of Japanese Office Action issued in connection with corresponding JP Application No. 2012-277546 dated Nov. 25, 2014.

May 26, 2017 Corrected Notice of Allowance in co-pending U.S. Appl. No. 13/722,182.

May 8, 2017 Notice of Allowance in co-pending U.S. Appl. No. 13/722,182.

Dec. 7, 2016 Final Office Action in co-pending U.S. Appl. No. 13/722,182.

Aug. 15, 2016 Office Action in co-pending U.S. Appl. No. 13/722,182.

Feb. 23, 2016 Final Office Action in co-pending U.S. Appl. No. 13/722,182.

Jul. 22, 2015 Final Office Action in co-pending U.S. Appl. No. 13/722,182.

Oct. 2, 2014 Final Office Action in co-pending U.S. Appl. No. 13/722,182.

Aug. 27, 2014 Office Action in co-pending U.S. Appl. No. 13/722,182.

Non-Final Office Action for corresponding U.S. Appl. No. 14/932,283 dated Jan. 25, 2018.

Final Office Action for corresponding U.S. Appl. No. 14/932,283 dated Jun. 13, 2018.

Office Action dated Nov. 23, 2018 for corresponding U.S. Appl. No. 14/932,283.

Office Action dated Jan. 9, 2019 in related U.S. Appl. No. 15/700,473.

\* cited by examiner

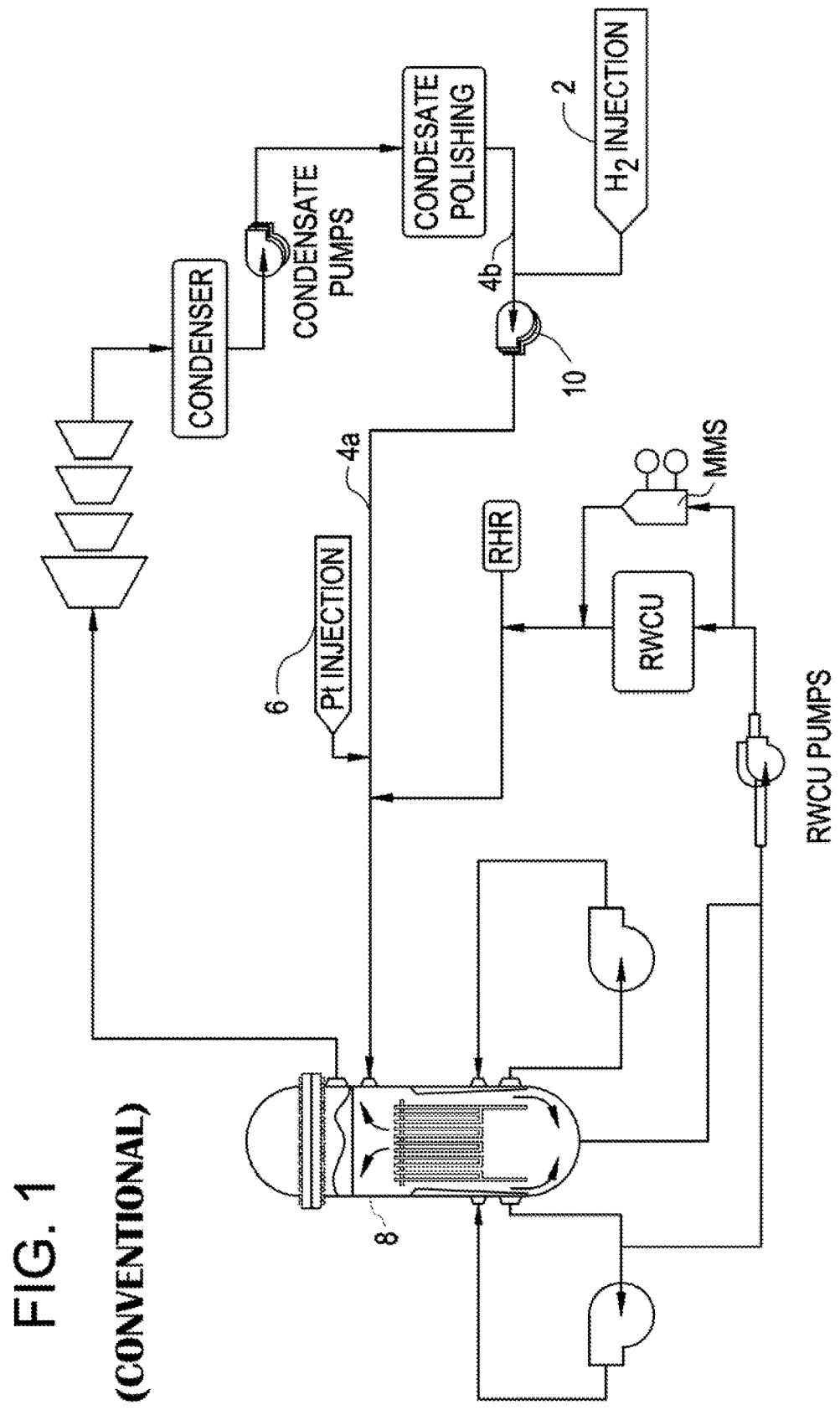
FIG. 1
(CONVENTIONAL)

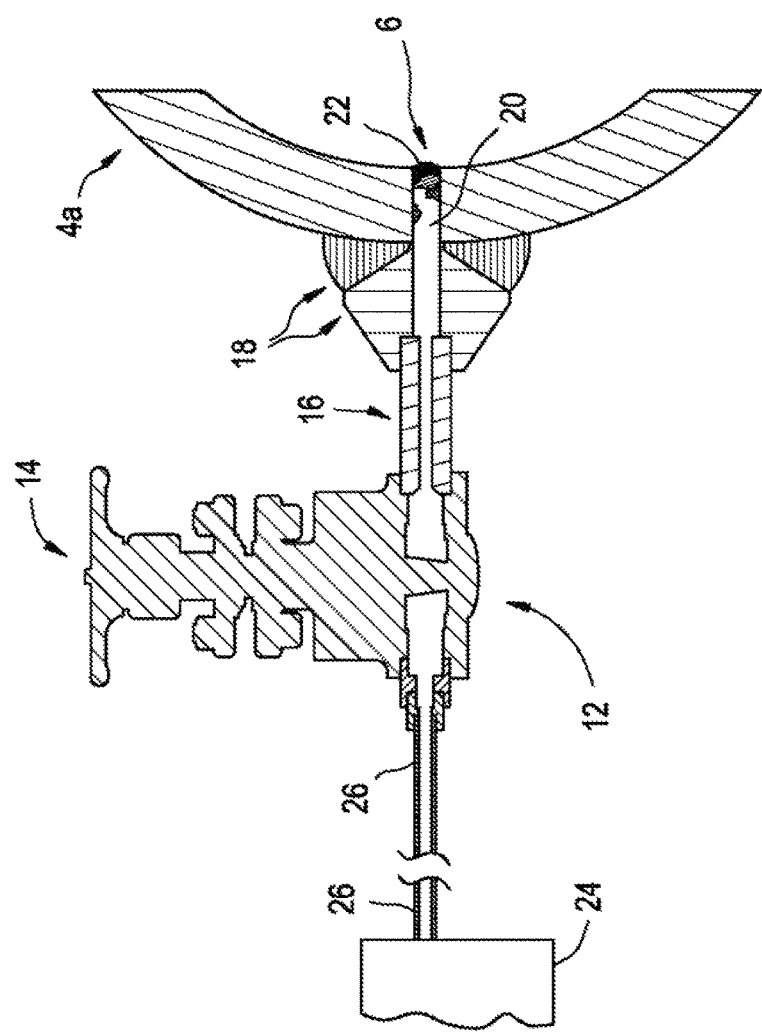
FIG. 2 (CONVENTIONAL)

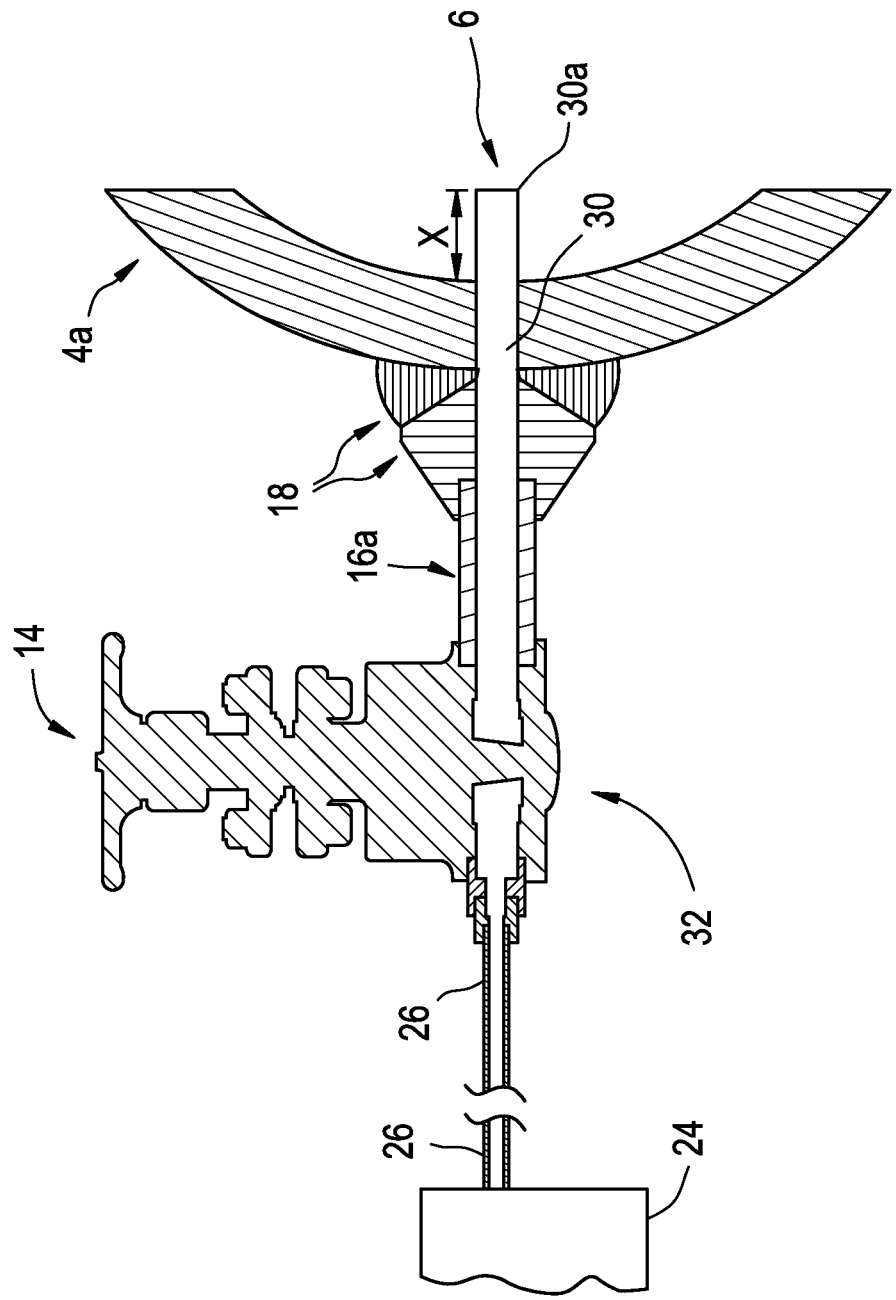

METHOD AND APPARATUS FOR A HIGH-TEMPERATURE DEPOSITION SOLUTION INJECTOR

BACKGROUND OF THE INVENTION

Field of the Invention

Example embodiments relate generally to nuclear reactors, and more particularly to a method and apparatus for a high-temperature deposition solution injector to deliver an ambient temperature deposition solution to a high temperature, high pressure feed-water flow line. In particular, the method and the apparatus ensures that the deposition solution is delivered in a location within the feed-water that is beyond the boundary layer of the flowing water, to prevent excessive deposition of the solution on the feed-water pipe just downstream of the injection tap and to prevent deposition of the solution within the injection tap, causing blockage of the tap.

Related Art

In a nuclear reactor, deposition solutions are often injected into a high temperature/pressure feed-water line in order to deposit materials on reactor surfaces. In particular, as shown in FIG. 1, hydrogen injection 2 may be used to inject hydrogen in a feed-water suction line 4b (the suction line 4b is the inlet to feed-water pumps 10) to act as an oxygen scavenger for the water circulating in the reactor 8. In conjunction with the hydrogen injection 2, a noble metal (e.g., platinum) deposition solution injection system 6 may be used to inject a deposition solution into the feed-water discharge line 4a in order to deposit platinum ions on surfaces of the reactor 8. While a Boiling Water Reactor (BWR) 8 configuration is depicted in FIG. 1, it should be understood that other types of nuclear reactors could also make use of deposition solution injections (such as the platinum deposition solution described herein). The platinum deposition solution may be, for example, a platinum salt solution of sodium hexahydroxyplatinate ($Na_2Pt(OH)_6$). By injecting the solution into the feed-water discharge 4a, platinum ions may deposit onto surfaces of the reactor 8 so that the platinum may act as a catalyst to react the injected hydrogen with oxygen molecules that may be present in the reactor. By causing hydrogen to react with oxygen molecules on surfaces of the reactor 8, water ($H_2O$) molecules may be produced. This reaction acts to reduce and potentially eliminate oxygen molecules present on surfaces of the reactor 8 that may otherwise promote corrosion of metal components, thereby extending the useful life of reactor components.

As shown in FIG. 2, a conventional deposition solution injector configuration 12 may include a chemical feed skid 24 supplying a deposition solution to the feed-water discharge line 4a. The chemical feed skid typically provides the chemical deposition solution at ambient temperatures with a flow-rate of around 50-120 $cm^3$/minute and a pressure typically less than 1250 psi (via positive displacement pumps). A chemical feed line 26 may provide the deposition solution from the chemical feed skid 24 to the injection tap 20. One or more injector valves 14 may be included in the chemical feed line 26 to provide shutoff for the deposition solution in the chemical feed line 26. Typically, a pipe stub 16 is included at the valve 14 discharge. A weldment 18 may connect the injection tap 20 to the pipe stub 16 and feed-water discharge line 4a.

Because a distal end of a conventional injection tap 20 may extend only to an inner surface of the feed-water discharge line 4a, deposited material 22 may form within the end of the injection tap 20. The deposited material 22 may form at the injection point 6, as the ambient (i.e., low) temperature deposition solution is mixed with intruding eddy flow of the high temperature, high velocity feed-water (ranging between 260 and 420° F. with a flow velocity of about 10-20 ft/sec) that may cause the deposition solution to break down into platinum ions which are then deposited within the inner distal end of the injection tap 20 (it is noted that sodium hexahydroxyplatinate, $Na_2Pt(OH)_6$, begins to break down at temperatures of 300-500° F.). Blockage of the injection tap 20 caused by the deposited material 22 may cause the positive displacement pumps to increase injection pressure to provide the specified injection flow rate. Pressure may increase to the design pressure of the injector configuration 12, resulting in termination of an injection before all of the deposition solution is injected. This may cause a reduced amount of platinum to be deposited within the reactor 8, itself. Furthermore, blockage of the injection tap 20 may prevent performance of the next scheduled injection (typically done once per year), or require an unplanned reactor shutdown to remove the blockage.

In addition to blockage of the injection tap 20 by deposited material 22 within the injection points 6, smearing of deposited material 22 may also occur along the inner surfaces of the feed-water line 4a as the slowly flowing deposition solution is unable to escape the boundary layer and enter the bulk flow of the feed-water. The smearing may cause significant amounts of platinum ions to deposit along the inside of the feed-water line where it is not needed or desired, which also may reduce the amount of platinum that reaches the reactor 8.

SUMMARY OF INVENTION

Example embodiments provide a method and an apparatus for injecting a deposition solution into a high pressure/temperature feed-water line. The method and apparatus ensure that the deposition solution is injected beyond a boundary layer of fluids traveling through the feed-water line and into the associated bulk flow of fluids. By injecting the deposition solution beyond the boundary layer, blockage of the injector and smearing of deposited material along the inner surfaces of the feed-water line may be mitigated.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 is a perspective view of a conventional boiling water nuclear reactor (BWR) including deposition solution injection;

FIG. 2 is a cross-sectional view of a conventional deposition solution injector configuration;

FIG. 3 is a cross-sectional view of a deposition solution injector configuration, in accordance with an example embodiment;

DETAILED DESCRIPTION

Figure 4A:
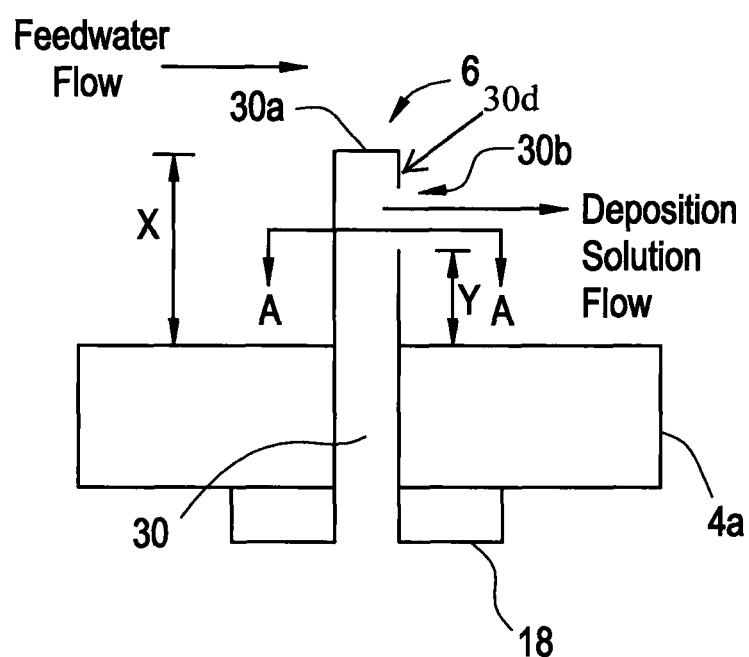
FIG. 4A is a cross-sectional view of a distal end of an injector, in accordance with an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms “comprises”, “comprising,”, “includes” and/or “including”, when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 3 is a cross-sectional view of a deposition solution injector configuration 32, in accordance with an example embodiment. The injector configuration 32 includes a hollow injector tube 30 with a distal end 30*a* that extends beyond the inner surface of the feed-water line 4*a*. In particular, the distal end 30*a* of the injector 30 may extend beyond a determined boundary layer of the bulk flow of fluids traveling through the feed-water line 4*a*. The depth of the boundary layer (and, the required length X of the distal end 30*a* of the injector 30) may vary depending upon the temperature and velocity of the feed-water. The depth of the boundary layer may also vary depending on the type of fluid flowing in the feed-water line 4*a* (with potentially varying viscosity), the diameter and material of the feed-water line 4*a*, as well as other parameters known to impact the Reynolds number (and resulting boundary layer depth) of fluid flowing in the feed-water line 4*a*. It should therefore be understood that the length X should at least be long enough to extend beyond the boundary layer of the fluid flowing in the feed-water line 4*a*.

Deposition solution injector configuration 32 also includes a pipe stub 16*a* with an inner diameter that matches or slightly exceeds the outer diameter of injector 30. This pipe stub 16*a* provides support to minimize vibration stresses in the injector 30 caused by feed-water flow forces.

The inner diameter of the injector 30 may also contribute to potential blockage caused by deposited material, if the deposition material is heated to high temperatures as it flows to the distal end 30*a* of injector 30. For this reason, the inside diameter of the injector 30 should be sized to be sufficiently small, ensuring that the deposition solution flows quickly through the hot region adjacent to the feed-water line 4*a*. For a 50-120 $cm^3$/minute flow rate of deposition solution through the injector 30, a ⅛ inch inner diameter of the injector 30 would result in flow velocities of 3-9 inches/second. This would cause the deposition solution to be in the hot region for less than a second, ensuring that the deposition solution does not degrade during this short period.

FIG. 4A is a cross-sectional view of a distal end 30*a* of an injector 30, in accordance with an example embodiment. The injector 30 is provided with an injection slot 30*b* located on a downstream side of the injector (specifically, the injector slot 30*b* is downstream of the feed-water flow passing across the distal end 30*a* of the injector 30). By locating the injection slot 30*b* on the downstream side of the injector 30, the slot 30*b* is somewhat sheltered from the high pressure flow of the feed-water, thereby reducing the potential for the injector 30 to become clogged by deposited material.

The injector should be sized to ensure that the entire injection slot 30*b* should extend beyond the boundary layer of flowing feed-water, just as the distal end 30*a* of the injector should extend beyond the boundary layer (as described in FIG. 3). This ensures that the deposition solution may be fully injected into the bulk flow of feed-water in the feed-water line 4*a* without experiencing unnecessarily high deposition of platinum ions on the inside of the feed-water line 4*a*. For this reason, length Y (the injector length from the inner surface of the feed-water line 4*a* to the opening of the injection slot 30*b*) must extend beyond the boundary layer of the feed-water. As described in FIG. 3, the boundary layer depth may vary depending on the temperature and velocity of the feed-water, the type of fluid flowing in the feed-water line, the diameter and material of the feed-water line, etc. As an example, for a 16 inch diameter feed-water line 4*a* with flowing water in a range of 15-20 feet/second at a temperature of 260-420° F., a length Y of 1 inch is adequate to ensure that the entire injection slot 30*b* extends beyond the boundary layer of fluids flowing in the feed-water line 4*a*.

The size of the injection slot 30*b* itself may also impact blockage of the injector 30. Therefore, the cross-sectional area of the injection slot 30*b* should be sized to ensure that the exit velocity of the deposition solution approximately matches the feed-water flow velocity, ensuring that feed-water eddy flows do not enter the injection slot 30*b* and cause deposition and possible blockage.

The injection slot 30*b* may be located a distance below the very distal end 30*a* of the injector 30 (notice offset 30*d*), to further shelter the injection slot 30*b* from the high pressures of the feed-water flow. However, the distal end 30*a* of the injector 30 should not extend too far beyond the depth of the feed-water boundary layer. By not extending the distal end 30*a* of the injector too far beyond the location of the boundary layer, bending and damage to the injector 30 by the high velocity feed-water flow may be avoided. Therefore, length X (the full length of the distal end 30*a* of the injector extending within the feed-water line 4*a*) should be no more than about 20% greater than the required length Y.

Figure 4B:
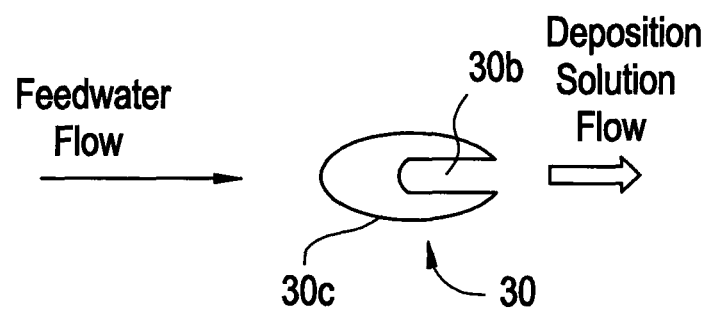
FIG. 4B is an axial, cross-sectional view A-A of the injector of FIG. 4A.

FIG. 4B is an axial, cross-sectional view A-A of the injector 30 of FIG. 4A. As discussed in FIG. 4A, the injection slot 30*b* may be located on a downstream side of the injector 30 (the downstream side, meaning downstream of the feed-water flow direction). The axial cross-sectional profile 30*c* of the injector may be a tapered, oval-shape with two acute ends (as shown in FIG. 4B), to hydrodynamically reduce feed-water fluid forces that may be experienced at the interface between the injection slot 30*b* and the bulk flow of the feed-water. The injection slot 30*b* may be located on the downstream-facing acute end of the injector 30 (as it is shown in FIG. 4B). The axial cross-sectional profile 30*c* may also be circular, square, or some other shape, so long as the injection slot 30*b* is located on the downstream side of the injector 30 to minimize eddy flow of incident feed-water that may enter into the injector 30.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of injecting a deposition solution into a high-temperature feed-water pipe, comprising:
    determining an expected boundary layer depth of fluid flowing within the feed-water pipe,
    inserting an injection tube of an injector through a side of the feed-water pipe so that a longitudinal length of the injection tube is positioned to traverse the fluid flowing within the feed-water pipe, the injection tube defining an injection slot along a portion of the longitudinal length of the injection tube,
    extending the injection tube into the feed-water pipe such that the injection slot extends beyond the expected depth of the boundary layer,
    rotating the injection tube to locate the injection slot on a downstream side of the injection tube, relative to a direction of the fluid flowing within the feed-water pipe,
    injecting, using the injector, the deposition solution into the feed-water pipe,
    wherein the extending of the injection tube into the feed-water pipe includes the distal end of the injection tube being extended into the feed-water pipe, a distal-most end of the injection tube being extended into the feed-water pipe by no more than 20% greater than the expected depth of the boundary layer.

2. The method of claim 1, wherein the inserting inserts an injection tube having an axial cross-section with an oval-shape with two tapered ends, the injection slot being located on one of the tapered ends.

3. The method of claim 1, wherein the inserting inserts an injection tube having an axial cross-section with a circular shape.

4. The method of claim 1, wherein the inserting inserts an injection tube having a cross-sectional area of the injection slot that is sized to cause a flow velocity of the deposition solution exiting the injection slot to be about equal to a flow velocity of the fluid flowing in the feed-water pipe.

5. The method of claim 1, further comprising:
    connecting the feed-water pipe to a nuclear reactor, the nuclear reactor being located downstream of the injector,
    wherein the deposition solution is sodium hexahydroxyplatinate.

6. The method of claim 5, wherein the injecting of the deposition solution into the feed-water pipe is accomplished via a chemical feed skid and positive displacement pumps.

7. The method of claim 1, wherein the inserting inserts an injection tube through a side of the feed-water pipe so that the longitudinal length of the injection tube is positioned about perpendicular with the fluid flowing within the feed-water pipe.

8. The method of claim 7, wherein the injection slot is offset from the distal end of the injection tube.

9. A method of injecting a deposition solution into a high-temperature feed-water pipe, comprising:
    determining an expected boundary layer depth of fluid flowing within the feed-water pipe,
    inserting an injection tube of an injector through a side of the feed-water pipe so that a longitudinal length of the injection tube is positioned to traverse the fluid flowing within the feed-water pipe, the injection tube defining an injection slot along a portion of the longitudinal length of the injection tube,
    extending the injection tube into the feed-water pipe such that the injection slot extends beyond the expected depth of the boundary layer,
    rotating the injection tube to locate the injection slot on a downstream side of the injection tube, relative to a direction of the fluid flowing within the feed-water pipe,
    injecting, using the injector, the deposition solution into the feed-water pipe,
    wherein the inserting inserts an injection tube having a cross-sectional area of the injection slot that is sized to cause a flow velocity of the deposition solution exiting the injection slot to be about equal to a flow velocity of the fluid flowing in the feed-water pipe,
    wherein the extending of the injection tube into the feed-water pipe includes a distal end of the injection tube being extended into the feed-water pipe, a distal-most end of the injection tube being extended into the feed-water pipe by no more than 20% greater than the expected depth of the boundary layer.

* * * * *